(12) United States Patent
Chen et al.

(10) Patent No.: US 12,177,892 B2
(45) Date of Patent: Dec. 24, 2024

(54) TRIGGER-BASED PPDU RESOURCE INDICATION FOR EHT NETWORKS

(71) Applicant: Intel Corporation, Santa Clara, CA (US)

(72) Inventors: Xiaogang Chen, Hillsboro, OR (US); Qinghua Li, San Ramon, CA (US); Feng Jiang, Sunnyvale, CA (US); Ziv Avital, Kadima (IL); Po-Kai Huang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/239,883

(22) Filed: Aug. 30, 2023

(65) Prior Publication Data

US 2024/0137971 A1    Apr. 25, 2024
US 2024/0237054 A9    Jul. 11, 2024

Related U.S. Application Data

(63) Continuation of application No. 17/123,893, filed on Dec. 16, 2020, now Pat. No. 11,792,842.

(Continued)

(51) Int. Cl.
*H04W 74/00* (2009.01)
*G06F 11/10* (2006.01)
(Continued)

(52) U.S. Cl.
CPC ....... *H04W 74/002* (2013.01); *G06F 11/1004* (2013.01); *H04W 72/0446* (2013.01);
(Continued)

(58) Field of Classification Search
CPC .......... H04W 74/002; H04W 72/0446; H04W 72/0453; G06F 11/1004
See application file for complete search history.

(56) References Cited

U.S. PATENT DOCUMENTS

| | | | | |
|---|---|---|---|---|
| 11,792,842 B2 * | 10/2023 | Chen | | H04W 72/20 370/329 |
| 2017/0055290 A1 | 2/2017 | Lv et al. | | |

(Continued)

OTHER PUBLICATIONS

"U.S. Appl. No. 17/123,893, Notice of Allowance mailed May 31, 2023", 11 pgs.

(Continued)

*Primary Examiner* — Mohammad S Anwar
(74) *Attorney, Agent, or Firm* — Schwegman Lundberg & Woessner, P.A.

(57) ABSTRACT

An extremely high throughput (EHT) station (STA) configured for trigger based (TB) transmission may decode an trigger frame (TF) received from an access point (AP). The TF may include an assignment of resources comprising one or more 20 MHz channels. The EHT STA may determine which of the one or more assigned channels are available for transmission and which of the allocated channels are unavailable when the EHT STA is assigned more than one 20 MHz channel. The EHT STA may encode a EHT TB PPDU in response to the trigger frame. The EHT TB PPDU may be encoded to include an EHT preamble followed by a data field. The EHT preamble may be encoded to indicate channel availability. The EHT STA may generate signalling to cause the EHT STA to transmit the encoded EHT TB PPDU only on the assigned channels that have been determined to be available.

20 Claims, 4 Drawing Sheets

Channel availability information in U-SIG

Related U.S. Application Data (60) Provisional application No. 62/976,494, filed on Feb. 14, 2020.

(51) Int. Cl.
*H04W 72/0446* (2023.01)
*H04W 72/0453* (2023.01)
*H04W 72/20* (2023.01)
*H04W 72/54* (2023.01)
*H04W 84/12* (2009.01)

(52) U.S. Cl.
CPC ....... *H04W 72/0453* (2013.01); *H04W 72/20* (2023.01); *H04W 72/54* (2023.01); *H04W 84/12* (2013.01)

(56) References Cited

U.S. PATENT DOCUMENTS

| | | |
|---|---|---|
| 2019/0045461 A1 | 2/2019 | Fang et al. |
| 2019/0109684 A1 | 4/2019 | Chen et al. |
| 2019/0238301 A1 | 8/2019 | Verma et al. |
| 2020/0141979 A1 | 5/2020 | Kirby et al. |
| 2021/0144752 A1 | 5/2021 | Chen et al. |

OTHER PUBLICATIONS

"U.S. Appl. No. 17/123,893, 312 Amendment filed Jul. 19, 2023", 7 pgs.

"U.S. Appl. No. 17/123,893, Corrected Notice of Allowability mailed Sep. 15, 2023", 2 pgs.

U.S. Appl. No. 17/123,893 U.S. Pat. No. 11,792,842, filed Dec. 16, 2020, Trigger-Based PPDU Resource Indication for EHT Networks.

* cited by examiner

FIG. 1

FIG 2 - Channel availability information in U-SIG

FIG. 3 - Channel availability information in EHT-SIG

FIG. 4

TRIGGER-BASED PPDU RESOURCE INDICATION FOR EHT NETWORKS

PRIORITY CLAIM

This application is a continuation of U.S. patent application Ser. No. 17/123,893, filed Dec. 16, 2020, which claims the benefit of priority under 35 USC 119(e) to U.S. Provisional Patent Application Ser. No. 62/976,494, filed Feb. 14, 2020 [reference number AC7777-Z], each of which is incorporated herein by reference in its entirety.

TECHNICAL FIELD

Embodiments pertain to wireless communications. Some embodiments relate to wireless local area networks (WLANs). Some embodiments relate to WLAN communications in accordance with the IEEE 802.11be draft standard (i.e., Extremely High Throughput (EHT)). Some embodiments relate to channel availability in trigger-based data transmission in EHT networks.

BACKGROUND

One issue with trigger-based (TB) data transmission in EHT networks is that the full bandwidth assigned to a station (STA) may not be available for transmission resulting in no transmission by the STA. Thus, there are general needs to make better use of the assigned bandwidth in TB data transmission.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments are directed to an extremely high throughput (EHT) station (STA) configured for trigger based (TB) transmission. In these embodiments, the EHT STA may decode an trigger frame (TF) received from an access point (AP) associated with the EHT STA. The TF may include an assignment of resources comprising one or more 20 MHz channels. The resources may comprise one or more scheduled resource units (RUs) assigned to one or more EHT STAs including the EHT STA. In these embodiments, the EHT STA may determine which of the one or more assigned channels are available for transmission and which of the allocated channels are unavailable when the EHT STA is assigned more than one 20 MHz channel. The EHT STA may encode a EHT TB PPDU in response to the trigger frame. The EHT TB PPDU may be encoded to include an EHT preamble followed by a data field. The EHT preamble may be encoded to indicate channel availability. In these embodiments, the EHT STA may generate signalling to cause the EHT STA to transmit the encoded EHT TB PPDU only on the assigned channels that have been determined to be available. In these embodiments, the EHT STA may refrain from transmitting on the assigned channels determined to be unavailable. In these embodiments, the EHT preamble may be encoded to indicate which of the assigned channels have been determined to be available and are being used by the EHT STA to transmit the EHT PPDU. These embodiments are described in more detail below.

In some embodiments, the EHT preamble may be encoded to include a U-SIG field, the U-SIG field to indicate channel availability by indicating a BSS color of the AP allow the AP to identify the EHT TB PPDU as a BSS PPDU instead of an OB SS PPDU. In these embodiments, the BSS color indicated in the U-SIG, along with transmission of the EHT TB PPDU on only the available channels will inform the AP that those channels are available as it will identify the EHT TB PPDU as being from within its BSS rather than an OB SS PPDU. Accordingly, the AP can detect U-SIG on the available channels and will not detect a U-SIG on unavailable channels.

In some embodiments, the EHT STA may encode the EHT preamble to include an EHT-SIG (signal) field following a U-SIG field, the EHT-SIG field encode to indicate channel availability. In these embodiments, the EHT-SIG may be encoded with a sequence. The sequence may include AP-specific information to allow the AP to identify the EHT TB PPDU as a BSS PPDU instead of an OBSS PPDU.

In some embodiments, the EHT STA may generate the sequence to have one of a plurality of orthogonal sequence patterns for transmission on each one of the assigned channels determined to be available, the sequence patterns to indicate channel-specific information for an associated channel. In some embodiments, the sequence patterns indicate one or more of MCS information and transmit power information for the associated channel.

In some embodiments, the AP-specific information may be a BSS color and wherein the sequence carried by the EHT-SIG transmitted on each available channel may be masked based on the BSS color to allow the AP to identify the EHT TB PPDU as a BSS PPDU instead of an OBSS PPDU.

In some embodiments, the EHT STA may encode the EHT preamble to include an EHT-SIG (signal) field following a U-SIG field, the EHT-SIG field encoded to indicate channel availability and having cyclic-redundancy-check (CRC) protection. In these embodiments, to indicate channel availably, the EHT-SIG field may be repeated on each available channel and encoded to indicate which of the assigned channels are available (using a number of bits). Accordingly, the AP only needs to decode the EHT-SIG field on one of the channels to determine which channels are available and are being used for transmission of the EHT TB PPDU.

In some embodiments, when the EHT STA is not assigned more than one 20 MHz channel (i.e., only a single 20 MHz channel is assigned), the EHT STA may refrain from indicating channel availability in the EHT preamble. In these embodiments, if the assigned channel is available, the EHT STA may transmit the EHT TB PPDU on the assigned channel. If the assigned channel is determined to be unavailable, the EHT STA will refrain from transmitting on the assigned channel.

In some embodiments, to determine if an assigned channel is available, the EHT STA may perform a CCA on each assigned channel. In some embodiments, for the EHT TB PPDU, the EHT STA may encode the EHT preamble to further include pre-EHT modulated fields comprising an L-STF field, an L-LTF field, an L-SIG field, and an RL-SIG field, followed by the U-SIG field and the EHT-SIG field.

In 802.11ax trigger-based data transmission, if an AP assigns 80 MHz RU to a client, but the client only has 40 MHz BW idle, then the client does not transmit anything even on the idle 40 MHz. So, the 40 MHz is wasted. 802.11ax defined a bandwidth query report poll (BQRP) mechanism which is a medium access control (MAC) protocol to try to solve this issue.

Example embodiments of the present disclosure relate to systems, methods, and devices for TB PPDU resource indication. In one embodiment, a trigger based (TB) physical layer (PHY) protocol data unit (PPDU) resource indication system may facilitate the following design principles: For the extreme high throughput (EHT) TB PPDU, the preamble shall include an EHT-SIG immediately following the U-SIG; 1) The EHT-SIG can be as short as one symbol. This symbol will include information that indicates which 20 MHz subchannels a client is transmitting the TB PPDU. 2) Several options are proposed for the indication of the available 20 MHz channel. 3) In addition to the channel availability, extra information can be carried by the preamble. For example, the status of Tx Power or modulation and coding scheme (MCS) requirement from the client.

Figure 1:
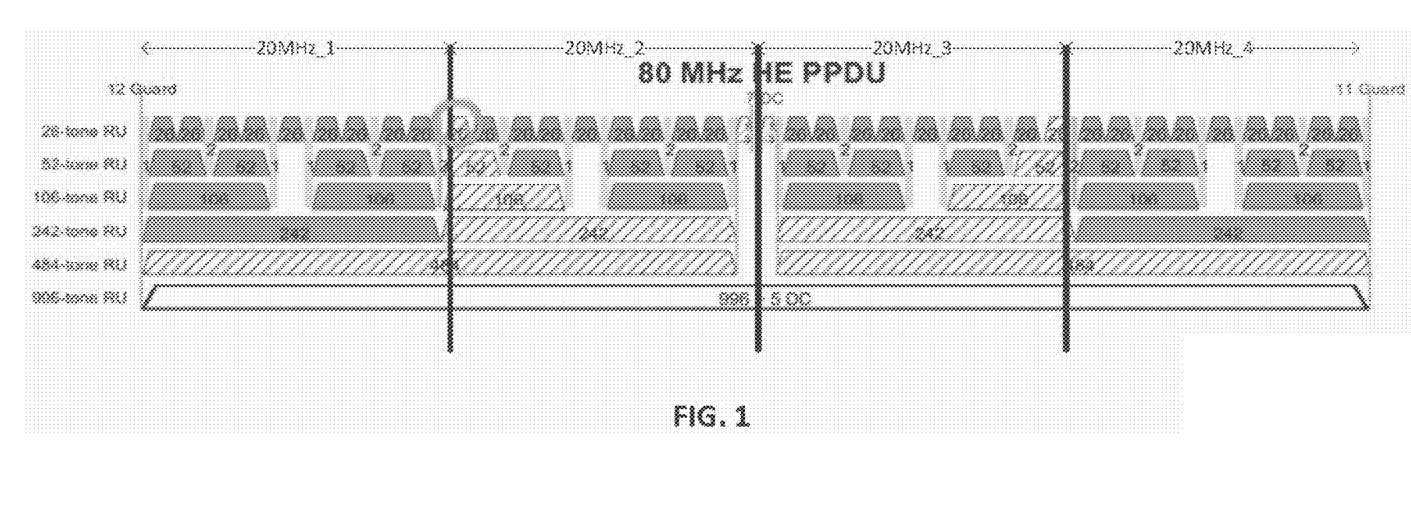
FIG. 1 illustrates resource units (RUs) in an 80 MHz PPDU in accordance with some embodiments.
Figure 2:
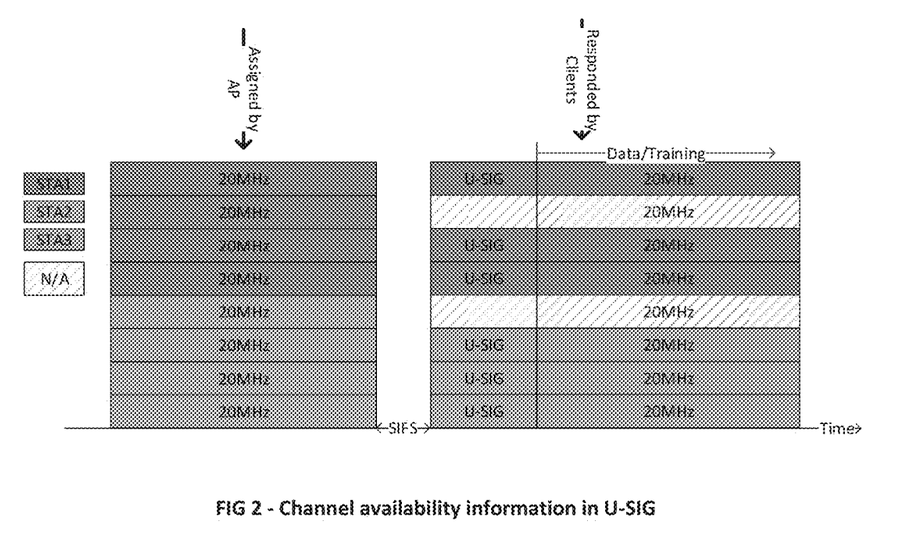
FIG. 2 illustrates channel availability information in a universal signal field (U-SIG) in accordance with some embodiments.
Figure 3:
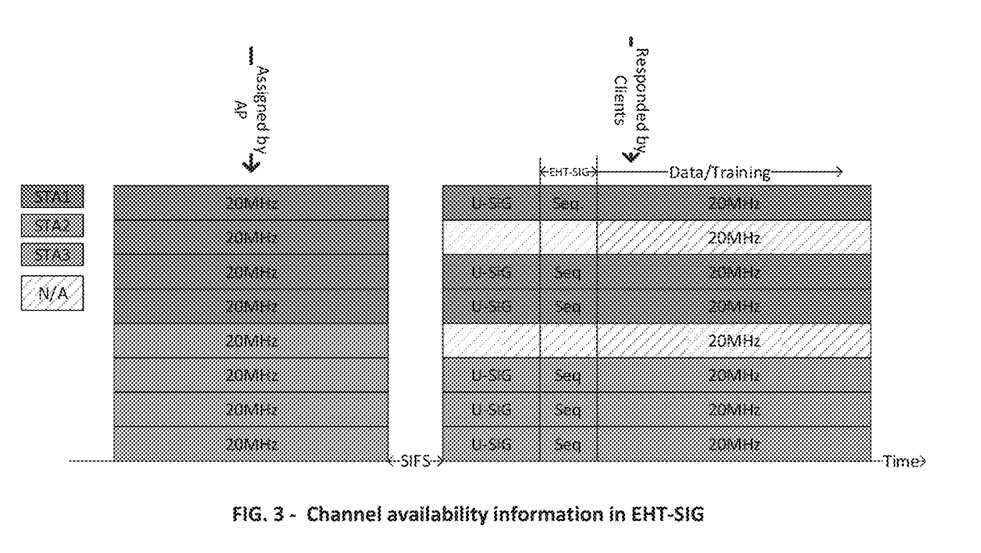
FIG. 3 illustrates channel availability information in the EHT-SIG in accordance with some embodiments.

FIGS. 1-3 depict illustrative schematic diagrams for TB PPDU resource indication, in accordance with one or more example embodiments of the present disclosure. In the EHT-Trigger based data transmission, AP can allocate a large RU (>=242 tone) or a small RU (<242 tone) to a client. If AP allocates a small RU to a client, the client can only choose to transmit or not transmit depends on the availability (clear channel assessment (CCA) decision) of the 20 MHz subchannel on which the small RU is allocated. So, the transmission state is either on or off. If AP allocates a larger RU, the client may not be able to transmit on all the resources AP allocated to the client. However, the client may be able to transmit on part of the resources. It may be proposed to enable the client to indicate to the AP on which 20 MHz subchannel it will transmit in the TB PPDU. This indication is self-contained in the PPDU instead of dedicated MAC frame. So, there are three transmission status: On, Partially on or Off.

This disclosure proposes several rules:
1) The 20 MHz subchannels that client transmit the TB PPDU shall be a subset of the frequency resources allocated by the AP. Namely, a client is not supposed to explore more frequency resource than the AP assigned to transmit the TB PPDU.
2) In addition to the channel availability, a client may indicate more information in the preamble of TB PPDU. E.g. Target RSSI cannot reach; maximum/minimum Tx power reached; etc.
3) In the EHT TB PPDU, if a client transmits a small RU and the RU straddles more than one 20 MHz subchannels, the pre-EHT modulated field (including legacy field, U-SIG, EHT-SIG) shall be transmitted on only one of the 20 MHz subchannels. The one subchannel shall be the one that has more overlapped frequency resources with the small RU. The reason that only one shall be transmitted is if more than one of the pre-EHT portions are transmitted, it's possible that the pre-EHT portion of the transmission from one client is overlapped with another client.

This rule (rule 3) is explained in FIG. 1. The pattern filled RUs are the ones that straddle more than one 20 MHz subchannel in 80 MHz. If a client transmits on the circled 26 RU, it shall only transmit the pre-EHT portion on the $2^{nd}$ 20 MHz and not on the $1^{st}$ 20 MHz. One exception is that if a client transmits TB PPDU on the central 26 RU it shall not transmit the pre-EHT modulated field.

On the design of the EHT-SIG in EHT TB PPDU:
Opt.1) Preamble Detection to Attain the Channel Availability (FIG. 2.)

As shown in FIG. 2, AP schedules three STAs in a trigger frame and assign 80 MHz to STA1 (blue), assign 60 MHz to STA2 (green), assign 20 MHz to STA3 (red). However, STA 1 only has 60 MHz available, and STA 2 only has 40 MHz available. STA1, STA2 and STA3 will indicate the channel availability information as shown in the response stage in FIG. 2.

The indication can be done by enabling AP detect U-SIG. For instance, a client will transmit U-SIG on the 20 MHz subchannels that are available for data transmission. And the client shall not transmit U-SIG on the 20 MHz subchannels that are not available. U-SIG shall include the information that could be used to identify the recipient of the TB PPDU. E.g. BSS color. Otherwise, an AP may miss detect the U-SIG from an OBSS TB PPDU as its own TB PPDU.

If U-SIG detection passes and the correct BSS color is detected on one 20 MHz subchannel, AP will interpret that TB PPDU is transmitted on this 20 MHz channel otherwise AP will interpret the 20 Mhz subchannel as not available. In FIG. 2, AP can detect U-SIG from $1^{st}$, $3^{rd}$, $4^{th}$ subchannel. Such that AP knows STA1 transmits the TB PPDU on three 20 MHz subchannels instead of four as assigned by AP. AP can detect the U-SIG from $1^{st}$ last and $2^{nd}$ last subchannel. Such that AP knows STA2 transmits the TB PPDU on two 20 MHz subchannels instead of three as assigned by AP.

This option doesn't require any change from the client side. It could be an optional feature for AP. If AP indicate to support this feature, then client can overwrite the scheduled resource in the trigger frame; If AP indicate to not support this feature, the client shall not overwrite the scheduled resource, and client can transmit only if all the allocated subchannels are available.

Opt.2) EHT-SIG Carries the Channel Availability Information (See FIG. 3.)

As shown in FIG. 3, the flow is similar with Opt.1). The difference is the EHT-SIG is presented in the TB PPDU. EHT-SIG can be used to indicate the availability of the 20 MHz subchannels.

For instance, the EHT-SIG can have only one symbol. A sequence is modulated in this symbol in each 20 MHz. The presence of a 20 MHz subchannel can be determined by AP via sequence detection per 20 MHz. The sequence detection can be non-coherent or coherent depends on the implementation at AP side.

The sequence can have different patterns and each of which is orthogonal to each other. Each pattern indicates a specific information. Table 1 gives an example to indicate different information with different sequence patterns.

The sequence shall include the AP specific information to avoid AP receives an OBSS sequence and false detects as a sequence from its own client. For instance, the sequence can be masked by a random sequence generated from the BSS color of the AP.

TABLE 1

Example of the indication of different sequence pattern:

| | |
|---|---|
| Seq pattern 1 | 20 MHz available Max Tx power reached |
| Seq pattern 2 | 20 MHz available recommend lower MCS |
| Seq pattern 3 | 20 MHz available recommend higher MCS |
| Seq pattern 4 | 20 MHz available Lowest Tx power reached |

Opt.2a) this Option can Use the Same Preamble Structure as Opt.2).

The difference is the channel availability information and the extra information shown in table 1 are indicated with signaling encoded in EHT-SIG with CRC protection instead of the sequence proposed in Opt.2.

For instance, 4 bits can be used to indicate the channel availability; 1 bit to indicate MCS adaptation; 1 bit to indicate Tx power information, etc. Within the 20 MHz subchannels a client used to transmit the TB PPDU; the EHT-SIG can be repeated in every 20 MHz. AP only need to decode the EHT-SIG in one 20 MHz subchannel to attain the information.

For another instance, U-SIG can include 1 bit to indicate if a client has overwritten the resource allocation in the trigger frame. This bit assists the AP make earlier decision. If a client indicates that the resource allocation in the trigger frame is not overwritten, then processing the EHT-SIG is optional to AP.

In these embodiments, the U-SIG field carries information necessary to interpret EHT PPDUs. The integer fields of the U-SIG field are transmitted in unsigned binary format, LSB first, where the LSB is in the lowest numbered bit position. The U-SIG field is designed to bring forward compatibility to the EHT preamble via the introduction of version independent fields. These are fields that will be consistent in location and interpretation across multiple IEEE 802.11 PHY amendments. The intent of the version independent content is to achieve better coexistence among future IEEE 802.11 generations. In addition, the U-SIG can have some version dependent fields that are fields specific to a PHY amendment. The U-SIG includes version independent bits followed by version dependent bits. PHY version identifier field shall be one of the version independent fields in the U-SIG. The purpose of the PHY version identifier is to simplify autodetection for future IEEE 802.11 generations, i.e., the value of this field is used to identify the exact PHY version starting with this amendment. The size of the U-SIG for EHT MU PPDU and EHT TB PPDU is two symbols. For forward compatibility, EHT Release 1 defines an extended range (ER) preamble while not defining an ER PPDU. This enables an EHT Release 1 STA to decode and interpret the version independent content in the U-SIG of an ER PPDU that may be introduced in future releases or amendments. The size of U-SIG for an ER preamble is four symbols.

In some embodiments, a physical layer protocol data unit may be a physical layer conformance procedure (PLCP) protocol data unit (PPDU). In some embodiments, the AP and STAs may communicate in accordance with one of the IEEE 802.11 standards. IEEE draft specification IEEE P802.11ax/D4.0, February 2019 is incorporated herein by reference in its entirety.

Figure 4:
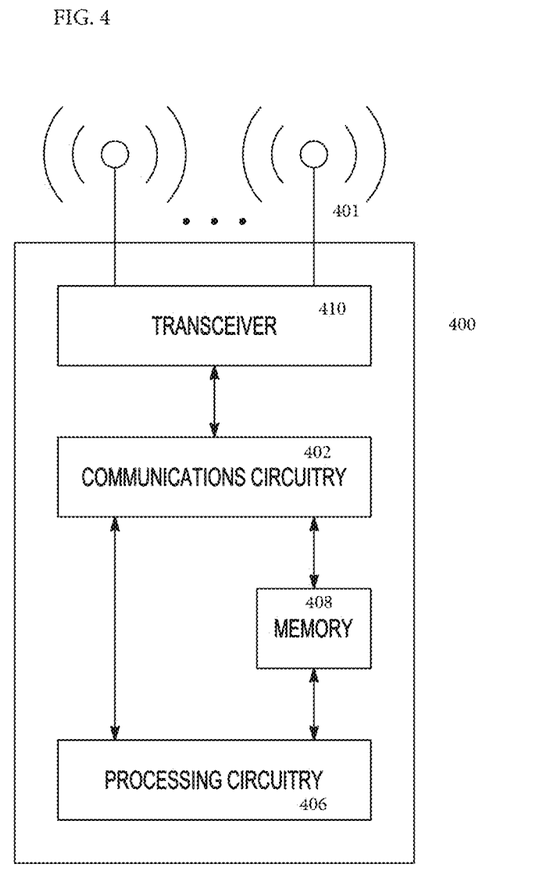
FIG. 4 illustrates a functional block diagram of a station in accordance with some embodiments.

In one embodiment, FIG. 4 illustrates a functional block diagram of a communication station that may be suitable for use as an AP or a user device in accordance with some embodiments. The communication station 400 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 400 may include communications circuitry 402 and a transceiver 410 for transmitting and receiving signals to and from other communication stations using one or more antennas 401. The communications circuitry 402 may include circuitry that can operate the physical layer (PHY) communications and/or medium access control (MAC) communications for controlling access to the wireless medium, and/or any other communications layers for transmitting and receiving signals. The communication station 400 may also include processing circuitry 406 and memory 408 arranged to perform the operations described herein. In some embodiments, the communications circuitry 402 and the processing circuitry 406 may be configured to perform operations detailed in the above figures, diagrams, and flows.

In accordance with some embodiments, the communications circuitry 402 may be arranged to contend for a wireless medium and configure frames or packets for communicating over the wireless medium. The communications circuitry 402 may be arranged to transmit and receive signals. The communications circuitry 402 may also include circuitry for modulation/demodulation, upconversion/downconversion, filtering, amplification, etc. In some embodiments, the processing circuitry 406 of the communication station 400 may include one or more processors. In other embodiments, two or more antennas 401 may be coupled to the communications circuitry 402 arranged for sending and receiving signals. The memory 408 may store information for configuring the processing circuitry 406 to perform operations for configuring and transmitting message frames and performing the various operations described herein. The memory 408 may include any type of memory, including non-transitory memory, for storing information in a form readable by a machine (e.g., a computer). For example, the memory 408 may include a computer-readable storage device, read-only memory (ROM), random-access memory (RAM), magnetic disk storage media, optical storage media, flash-memory devices and other storage devices and media.

In some embodiments, the communication station 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 400 may include one or more antennas 401. The antennas 401 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 400 may include one or more of a keyboard, a display, a non-volatile memory port, multiple antennas, a graphics processor, an application processor, speakers, and other mobile device elements. The display may be an LCD screen including a touch screen.

Although the communication station 400 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 400 may refer to one or more processes operating on one or more processing elements.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an extremely high throughput (EHT) station (STA), the apparatus comprising: processing circuitry; and memory,
   the processing circuitry is configured to:
   decode a trigger frame (TF) received from an EHT access point (AP) associated with the EHT STA, the TF indicating an uplink bandwidth that is at least of one 20 MHz, 40 MHz and 80 MHz, the trigger frame further including a resource unit allocation indicating an allocation of resources within the uplink bandwidth,
   encode a EHT TB physical layer (PHY) protocol data unit (PPDU) in response to the trigger frame, the EHT TB PPDU encoded to include an EHT preamble followed by a data field, the EHT preamble encoded to include a universal signal field (U-SIG) followed by an EHT signal field (EHT-SIG), the U-SIG encoded to include a field to indicate a transmission bandwidth of the EHT TB PPDU, and
   generate signalling to cause the EHT STA to transmit the encoded EHT TB PPDU in accordance with the transmission bandwidth,
   wherein to generate the signalling for transmission of the EHT TB PPDU, the processing circuitry is configured to:
   encode the U-SIG with identical content for transmission on each non-punctured 20 MHz subchannel of the transmission bandwidth; and
   encode the EHT-SIG with different content for transmission on each non-punctured 20 MHz subchannel of the transmission bandwidth.

2. The apparatus of claim 1, wherein the different content for each EHT-SIG comprises resource unit (RU) information for an associated one of the non-punctured 20 MHz subchannels for use in fields of the EHT TB PPDU that follow the EHT-SIG.

3. The apparatus of claim 2, wherein the non-punctured 20 MHz subchannels are available 20 MHz subchannels of the uplink bandwidth.

4. The apparatus of claim 3, wherein 20 MHz subchannels of the uplink bandwidth that are unavailable are punctured 20 MHz subchannels.

5. The apparatus of claim 4, wherein the processing circuitry is configured to encode the U-SIG field to indicate a basic service set (BSS) color of the EHT AP to identify the EHT TB PPDU as a BSS PPDU instead of a PPDU of an overlapping BSS (OBSS).

6. The apparatus of claim 4, wherein the transmission bandwidth of the EHT TB PPDU comprises an available bandwidth within the uplink bandwidth allocated by the trigger frame.

7. The apparatus of claim 6, wherein the available bandwidth comprises the non-punctured 20 MHz subchannels within the uplink bandwidth.

8. The apparatus of claim 7, wherein the processing circuitry is configured to determine availability of the 20 MHz subchannels within the uplink bandwidth indicated by the trigger frame.

9. The apparatus of claim 8, wherein to determine if one of the 20 MHz subchannels within the uplink bandwidth is available, the processing circuitry is to configure the EHT STA to perform a clear-channel assessment (CCA).

10. The apparatus of claim 1, wherein the preamble of the EHT TB PPDU is further encoded to include pre-EHT modulated fields comprising an L-STF field, an L-LTF field, an L-SIG field, and an RL-SIG field, followed by the U-SIG field.

11. A non-transitory computer-readable storage medium that stores instructions for execution by processing circuitry of an extremely high throughput (EHT) station (STA), the processing circuitry configured to:
    decode a trigger frame (TF) received from an EHT access point (AP) associated with the EHT STA, the trigger frame indicating an uplink bandwidth that is at least of one 20 MHz, 40 MHz and 80 MHZ,
    the trigger frame further including a resource unit allocation indicating an allocation of resources within the uplink bandwidth,
    encode an EHT trigger-based (TB) physical layer (PHY) protocol data unit (PPDU) for transmission in response to the trigger frame, the EHT TB PPDU encoded to include an EHT preamble followed by a data field,
    the EHT preamble encoded to include a universal signal field (U-SIG) followed by an EHT signal field (EHT-SIG),
    the U-SIG encoded to include a field to indicate a transmission bandwidth of the EHT TB PPDU,
    generate signalling to cause the EHT STA to transmit the EHT TB PPDU in accordance with the transmission bandwidth,
    wherein to generate the signalling for transmission of the EHT TB PPDU, the processing circuitry is configured to:
    encode the U-SIG with identical content for transmission on each non-punctured 20 MHz subchannel of the transmission bandwidth; and
    encode the EHT-SIG with different content for transmission on each non-punctured 20 MHz subchannel of the transmission bandwidth.

12. The non-transitory computer-readable storage medium of claim 11, wherein the different content for each EHT-SIG comprises resource unit (RU) information for an associated one of the non-punctured 20 MHz subchannels for use in fields of the EHT TB PPDU that follow the EHT-SIG.

13. The non-transitory computer-readable storage medium of claim 12, wherein the non-punctured 20 MHz subchannels are available 20 MHz subchannels of the uplink bandwidth.

14. The non-transitory computer-readable storage medium of claim 13, wherein 20 MHz subchannels of the uplink bandwidth that are unavailable are punctured 20 MHz subchannels.

15. The non-transitory computer-readable storage medium of claim 14, wherein the processing circuitry is configured to encode the U-SIG field to indicate a basic service set (BSS) color of the EHT AP to identify the EHT TB PPDU as a BSS PPDU instead of a PPDU of an overlapping BSS (OBSS).

16. The non-transitory computer-readable storage medium of claim 14, wherein the transmission bandwidth of the EHT TB PPDU comprises an available bandwidth within the uplink bandwidth allocated by the trigger frame.

17. The non-transitory computer-readable storage medium of claim 16, wherein the available bandwidth comprises the non-punctured 20 MHz subchannels within the uplink bandwidth.

18. The non-transitory computer-readable storage medium of claim 17, wherein the processing circuitry is configured to determine availability of the 20 MHz subchannels within the uplink bandwidth indicated by the trigger frame.

19. A method performed by processing circuitry of an extremely high throughput (EHT) station (STA), the method comprising:

decoding a trigger frame (TF) received from an EHT access point (AP) associated with the EHT STA, the trigger frame indicating an uplink bandwidth that is at least of one 20 MHz, 40 MHz and 80 MHz, the trigger frame further including a resource unit allocation indicating an allocation of resources within the uplink bandwidth, encoding an EHT trigger-based (TB) physical layer (PHY) protocol data unit (PPDU) for transmission in response to the trigger frame, the EHT TB PPDU encoded to include an EHT preamble followed by a data field, the EHT preamble encoded to include a universal signal field (U-SIG) followed by an EHT signal field (EHT-SIG), the U-SIG encoded to include a field to indicate a transmission bandwidth of the EHT TB PPDU, generating signalling to cause the EHT STA to transmit the EHT TB PPDU in accordance with the transmission bandwidth, wherein to generate the signalling for transmission of the EHT TB PPDU, the method comprises:

encoding the U-SIG with identical content for transmission on each non-punctured 20 MHz subchannel of the transmission bandwidth; and encoding the EHT-SIG with different content for transmission on each non-punctured 20 MHz subchannel of the transmission bandwidth.

20. The method of claim 19, wherein the different content for each EHT-SIG comprises resource unit (RU) information for an associated one of the non-punctured 20 MHz subchannels for use in fields of the EHT TB PPDU that follow the EHT-SIG.

* * * * *